United States Patent
Yamaguchi et al.

(10) Patent No.: US 6,486,289 B1
(45) Date of Patent: *Nov. 26, 2002

(54) CURABLE COMPOSITION

(75) Inventors: Izumi Yamaguchi, Akashi (JP); Masayuki Fujita, Himeji (JP); Hiroshi Iwakiri, Kobe (JP)

(73) Assignee: Kaneka Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/529,168

(22) PCT Filed: Oct. 7, 1998

(86) PCT No.: PCT/JP98/04533

§ 371 (c)(1),
(2), (4) Date: Jun. 14, 2000

(87) PCT Pub. No.: WO99/19405

PCT Pub. Date: Apr. 22, 1999

(30) Foreign Application Priority Data

Oct. 9, 1997 (JP) .............................................. 9-293504

(51) Int. Cl.⁷ ............................................... C08G 77/08
(52) U.S. Cl. ............................. 528/18; 528/26; 528/34; 525/100

(58) Field of Search ................................ 528/18, 26, 34; 525/100

(56) References Cited

U.S. PATENT DOCUMENTS 5,424,383 A * 6/1995 Kimura et al. ................. 528/12

FOREIGN PATENT DOCUMENTS

| EP | 0 473 793 A1 | 3/1992 |
| JP | 5-117519 | 5/1993 |
| JP | 0 605 712 1 | 3/1994 |

* cited by examiner

Primary Examiner—Margaret G. Moore
(74) Attorney, Agent, or Firm—Connolly Bove Lodge & Hutz LLP

(57) ABSTRACT

The present invention has its object to provide a curable composition insuring a reduced stress without sacrificing restoring force and other physical properties and having a sufficient degree of adhesiveness.

The present invention is related to a curable composition comprising comprising an oxyalkylene polymer having at least one reactive silicon group per molecule (A-1), an acid (B), an amine (C), and a tin-series curing catalyst (D).

This composition optionally contains a vinyl polymer having at least one reactive silicon group.

11 Claims, No Drawings

CURABLE COMPOSITION

TECHNICAL FIELD

The present invention relates to a curable composition which is conducive to reducing a tensile stress with a high restoring force retained and has a sufficiently high degree of adhesiveness.

BACKGROUND ART

Polymers containing reactive silicon groups cure by crosslinking in the presence of moisture. A curable composition utilizing a polymer the backbone chain of which is a polyoxypropylene, among them, has the characteristic of being liquid at room temperature but forming a rubber elastomer on curing and has, therefore, been used universally as, for example, a sealant for architectural use.

For use in architectural applications, a curable composition is required to be of high restoring force and low stress in order to follow the shrinkage of joints.

As means for implementing a low stress feature, a method, comprising changing polymer species and that comprising increasing the amount of the curing catalyst, and the like are known. However, with any of such means, a reduction in stress is accompanied by a decrease in restoring force so that a curable composition having a satisfactory balance of stress and restoring force cannot be obtained.

Moreover, in order that such a composition can be used as a sealant, the composition is further required to have satisfactory adhesive properties. For the construction of a cured product of the sealant, a tin-series curing catalyst or an amine-series promotor is usually employed. However, the concomitant use of an amine compound causes the problem of lowering adhesiveness and is, therefore, not recommendable for sealant use.

DISCLOSURE OF THE INVENTION

The present invention is directed to a curable composition comprising an oxyalkylene polymer (A-1) having at least one reactive silicon group per molecule, an acid (B), an amine (C), and a tin-series curing catalyst (D).

The invention is now described in detail.

The present invention comprises an oxyalkylene polymer (A-1), an acid (B), an amine (C) and a tin-series curing catalyst (D).

The component (A-1) mentioned above contains at least one reactive silicon group per polymer molecule. If the number of reactive silicon groups per molecule is less than 1, the polymer will be insufficient in curability, and, therefore, the above range must be adhered to. The preferred number is 1.1 to 5. Exceeding 5 is undesirable, for the network structure will become too dense to show satisfactory mechanical characteristics.

The backbone chain of said oxyalkylene polymer (A-1) having at least one reactive silicon group per molecule has a repeating unit of the following general formula (1).

$$—R^1—O—  \quad (1)$$

(wherein $R^1$ represents a divalent hydrocarbon group)

$R^1$ mentioned above is not particularly restricted insofar as it is a divalent hydrocarbon group but is preferably a methylene group or a straight-chain or branched-chain alkylene group containing 2 to 14 carbonatoms. The more preferred group is a straight-chain or branched-chain alkylene group of 2 to 4 carbon atoms.

The repeating unit of the general formula (1) mentioned above is not particularly restricted, but there can be mentioned —$CH_2O$—, —$CH_2CH_2O$—, —$CH_2CH(CH_3)O$—, —$CH_2CH(C_2H_5)O$—, —$CH_2C(CH_3)_2O$—, and —$CH_2CH_2CH_2CH_2O$—, among others.

The backbone chain of said oxyalkylene polymer (A-1) may comprise one species of said repeating unit represented by general formula (1) or comprise two or more species of said repeating units.

Said backbone chain of oxyalkylene polymer (A-1) may contain urethane-binding and/or other moieties within the range not seriously affecting the characteristics of the oxyalkylene polymer.

The urethane-binding moiety mentioned above are not particularly restricted, but there can be mentioned the moiety available from the reaction of an aromatic polyisocyanate, e.g. toluene(tolylene) diisocyanate, diphenylmethane diisocyanate, xylylene diisocyanate or the like, or an aliphatic polyisocyanate, e.g. isophorone diisocyanate, hexamethylene diisocyanate or the like, with a polyol having the above repeating unit of the general formula (1).

The reactive silicon group in said component (A-1) is a silicon-containing group having a hydrolyzable group or a hydroxyl group as the reactive group and is preferably a group of the following general formula (2).

$$—[Si(R^2)_{2-a}(X)_aO]_m—Si(R^3)_{3-b}(X)_b \quad (2)$$

wherein $R^2$ and $R^3$ are the same or different and each represents an alkyl group of 1 to 20 carbon atoms, an aryl group of 6 to 20 carbon atoms, an aralkyl group of 7 to 20 carbon atoms or a triorganosiloxy group of the formula $(R^4)_3SiO$— in which $R^4$ represents a monovalent hydrocarbon group of 1 to 20 carbon atoms and the three $R^4$ groups may be the same or different; when $R^2$ or R exists in 2 or more, each may represent the same group or different groups; X represents a hydrolyzable group or a hydroxyl group and when X exists in 2 or more, each may represent the same group or different groups; a represents an integer of 0 to 2; b represents an integer of 0 to 3; m represents an integer of 0 to 19 and when m exists in 2 or more, a in m of the—$[Si(R^2)_{2-a}(X)_aO]_m$— group may represent the same value or different values. It should be understood that said reactive silicon group of the general formula (2) contains at least one hydrolyzable group or hydroxyl group represented by X.

The above-mentioned alkyl group of 1 to 20 carbon atoms is not particularly restricted, but there can be mentioned methyl, ethyl, isopropyl, butyl, t-butyl and cyclohexyl, among others.

The aryl group of 6 to 20 carbon atoms is not particularly restricted but may for example be phenyl or naphthyl.

The aralkyl group of 7 to 20 carbon atoms is not particularly restricted but may for example be benzyl.

The monovalent hydrocarbon group of 1 to 20 carbon atoms is not particularly restricted, but there can be mentioned methyl, ethyl, isopropyl, butyl, t-butyl, pentyl, ethinyl, 1-propenyl, vinyl allyl, 1-methylbutyl, 2-ethylbutyl and phenyl, among others.

Said hydrolyzable group represented by X is not particularly restricted, but there can be mentioned various known groups such as hydrogen, halogen, alkoxy, acyloxy, ketoximate, amino, amido, acid amide, aminooxy, mercapto, alkenyloxy, etc. Among these, hydrogen, alkoxy, acyloxy, ketoximate, amino, amido, aminooxy, mercapto and alkenyloxy are preferred, and from the standpoint of mild hydrolyzability and ease of handling, alkoxy groups are particularly preferred.

The hydroxyl or hydrolyzable group represented by X can bind, within the range of 1 to 3, to one silicon atom. Moreover, the sum of the hydroxyl and hydrolyzable groups in said reactive silicon group of the general formula (2) is preferably within the range of 1 to 5.

The silicon atom forming said reactive silicon group may be one or two or more, and when silicon atoms are joined by siloxane bonding or the like, the number may be 20 at a maximum.

Among reactive silicon groups represented by the above general formula (2), reactive silicon groups of the following general formula (3) are readily available and, therefore, can be used with advantage in the practice of the present invention.

$$—Si(R^3)_{3-b}X_b \qquad (3)$$

(wherein $R^3$, $X$, and $b$ are as defined hereinbefore).

Referring to said component (A-1), the method for introduction of said reactive silicon group of the general formula (2) is not particularly restricted but any of the known methods, such as the following, can be utilized.

(1) The process comprising reacting an oxyalkylene polymer having a functional group such as hydroxyl within its molecule with an organic compound having an active group reactive to said functional group and an unsaturated group to thereby give an unsaturated group-containing oxyalkylene polymer or carrying out a copolymerization reaction with an epoxy compound containing an unsaturated group to thereby give an unsaturated group-containing oxyalkylene polymer and then hydrosilylating the resulting unsaturated group-containing oxyalkylene polymer with a reactive silicon group-containing hydrosilane.

(2) The process comprising an unsaturated group-containing oxyalkylene polymer prepared in the same manner as in process (1) with a compound having a mercapto group and a reactive silicone group.

(3) The process comprising reacting an oxyalkylene polymer having a functional group, such as hydroxyl, epoxy and isocyanato, within its molecule with a compound having a functional group reactive to this functional group and a reactive silicon group.

Among the above processes, either process (1) or process (3) wherein the hydroxy-terminated polymer is reacted with a compound having an isocyanate group and a reactive silicon group is preferred.

The above component (A-1) may be a straight-linear polymer or a branched linear polymer and its molecular weight is preferably about 500 to 50,000, more preferably 1000 to 30,000.

Species of said component (A-1) are not particularly restricted, but there can be mentioned the polymers disclosed in Japanese Kokoku Publication Sho-45-36319, Japanese Kokoku Publication Sho-46-12154, Japanese Kokai Publication Sho-50-156599, Japanese Kokai Publication Sho-54-6096, Japanese Kokai Publication Sho-55-13767, Japanese Kokai Publication Sho-55-13468, Japanese Kokai Publication Sho-57-164123, Japanese Kokoku Publication Hei-3-2450, U.S. Pat. Nos. 3,632,557, 4,345,053, 4,366,307 and 4,960,844 and the polyoxyalkylene polymers having high molecular weights but narrow molecular weight distributions with number average molecular weights $\geq 6000$ and Mw/Mn values $\leq 1.6$ as disclosed in Japanese Kokai Publication Sho-61-197631, Japanese Kokai Publication Sho-61-215622, Japanese Kokai Publication Sho-61-215623 and Japanese Kokai Publication Sho-61-218632, among others.

The reactive silicon group-containing oxyalkylene polymer (A-1) mentioned above can be used each alone or in a combination of two or more species.

The present invention may also be carried into practice using a blend of said oxyalkylene polymer (A-1) with a reactive silicone group-containing vinyl polymer (A-2).

The reactive silicon group-containing vinyl polymer (A-2) mentioned above is preferably a polymer obtainable by introducing said reactive silicon group of the general formula (2) into a vinyl copolymer. The reactive silicon group-containing vinyl polymer (A-2) is not particularly restricted, but there can be mentioned the polymers disclosed in Japanese Kokai Publication Sho-59-122541, Japanese Kokai Publication Sho-63-112642, and Japanese Kokai Publication Hei-6-172631, among others.

More particularly, those polymers are obtainable by introducing said reactive silicon group of the general formula (2) into a molecular chain substantially comprising an acrylic ester monomer unit and/or methacrylic ester monomer unit having an alkyl group of 1 to 8 carbon atoms which is represented by the following general formula (4):

$$—CH_2—C(R^5)(COOR^4)— \qquad (4)$$

(wherein $R^4$ represents an alkyl group containing 1 to 8 carbon atoms; $R^5$ represents a hydrogen atom or a methyl group) and an acrylic ester monomer unit and/or methacrylic ester monomer unit having an alkyl group of not less than 10 carbon atoms, which is represented by the following general formula (5):

$$—CH_2—C(R^7)(COOR^6)— \qquad (5)$$

(wherein $R^6$ represents an alkyl group containing not less than 10 carbon atoms; $R^7$ represents a hydrogen atom or a methyl group) optionally together with some other monomer units.

In the above general formula (4), $R^4$ is not particularly restricted insofar as it is an alkyl group of 1 to 8 carbon atoms, thus including methyl, ethyl, propyl, n-butyl, t-butyl and 2-ethylhexyl, among others. Particularly preferred are alkyl groups having 1 to 4 carbon atoms, with alkyl groups having 1 to 2 carbon atoms being still more preferred. Those may be used each alone or in a combination of two or more species.

In the above general formula (5), $R^6$ is not particularly restricted insofar as it is an alkyl group containing not less than 10 carbon atoms, but there can be mentioned lauryl, tridecyl, cetyl, stearyl, nonadecyl, eicosyl and behenyl, among others. Particularly preferred are alkyl groups having 10 to 30 carbon atoms, with alkyl groups having 10 to 20 carbon atoms being still more preferred. Those may be used each alone or in a combination of two or more species.

The molecular chain of said reactive silicon group-containing vinyl polymer (A-2) substantially comprises said monomer unit of the general formula (4) and said monomer unit of the general formula (5). The term "substantially" in this context means that the sum of the monomer units of the general formula (4) and general formula (5) in said molecular chain is in excess of 50 weight %. It is preferred that the sum of said monomer unit of the general formula (4) and monomer unit of the general formula (5) is not less than 70 weight %.

Furthermore, the occurrence ratio of said monomer unit of the general formula (4) to said monomer unit of the general formula (5) is preferably 95:5 to 40:60 by weight, more preferably 90:10 to 60:40 by weight.

The other monomer units mentioned above are not particularly restricted, but there can be mentioned other monomer units derived from: acrylic acids such as acrylic acid, methacrylic acid, etc.; amide group-containing monomers such as acrylamide, methacrylamide, N-methylolacrylamide, N-methylolmethacrylamide, etc.; epoxy group-containing monomers such as glycidyl acrylate, glycidyl methacrylate, etc.; therefrom amino group-containing monomers such as diethylaminoethyl acrylate, diethylaminoethyl methacrylate, aminoethyl vinyl ether, etc.; acrylonitrile, styrene, α-methylstyrene, alkyl vinyl ethers, vinyl chloride, vinyl acetate, vinyl propionate, and ethylene or the like.

The method of introducing said reactive silicon group into the molecular chain comprising said monomer units is not particularly restricted but any of the known processes can be utilized. For example, a vinyl monomer containing said reactive silicon group of the general formula (2) can be introduced by way of copolymerization.

In this procedure, said reactive silicon group-containing vinyl monomer is used in such a proportion that the average number of reactive silicon groups in said reactive silicon group-containing vinyl polymer (A-2) will be not less than 1, preferably not less than 1.1, and more preferably not less than 1.5 in order that a sufficient degree of curability may be obtained.

Moreover, the introduction of said reactive silicon group is preferably carried out so that the apparent number average molecular weight per reactive silicon group will be 300 to 4000.

Said reaction silicon group-containing vinyl polymer (A-2) is preferably a polymer with a number average molecular weight of 500 to 100000 from the standpoint of ease of handling.

The relative amount of said reactive silicon group-containing vinyl polymer (A-2) based on 100 weight parts of said reactive silicon group-containing oxyalkylene polymer (A-1) is preferably 0.1 to 1000 weight parts, more preferably 1 to 200 weight parts.

Furthermore, in the present invention, a polymer obtainable by polymerizing a (meth) acrylic ester monomer in the presence of said reactive silicon group-containing oxyalkylene polymer (A-1) can also be used. This type of polymer has been typically described in Japanese Kokai Publication Sho-59-78223,. Japanese Kokai Publication Sho-59-168014, Japanese Kokai Publication Sho-60-228516 and Japanese Kokai Publication Sho-60-228517, among other publications, however it is not limited to these polymers.

The acid (B) to be formulated in the curable composition of the present invention is not particularly restricted but various organic acids and inorganic acids can be used. As typical examples of the acid (B) which can be used, the following compounds can be mentioned, however it is not limited to these acids.

① Carboxylic Acids

The carboxylic acids are not particularly restricted, but there can be mentioned saturated monocarboxylic acids such as formic acid, acetic acid, acetoacetic acid, ethylmethylacetic acid, propionic acid, butyric acid, isoacetic acid, 2-ethylbutyric acid, ethoxyacetic acid, valeric acid, isovaleric acid, hexanoic acid, 2-ethylhexanoic acid, octanoic acid, decanoic acid, undecanoic acid, stearic acid, glyoxylic acid, glycolic acid, gluconic acid, etc.; olefin monocarboxylic acids such as acrylic acid, methacrylic acid, angelicic acid, crotonic acid, isocrotonic acid, 10-undecenoic acid, elaidic acid, erucic acid, oleic acid, etc.;

acetylenemonocarboxylic acids such as propiolic acid etc.; diolefincarboxylic acids such as linoleic acid, linoelaidic acid, etc.; polyunsaturated monocarboxylic acids such as linolenic acid, arachidonic acid, etc.; saturated dicarboxylic acids such as adipic acid, azelaic acid, ethylmalonic acid, glutaric acid, oxalic acid, malonic acid, succinic acid, oxydiacetic acid, etc.; unsaturated dicarboxylic acids such as maleic acid, fumaric acid, acetylenedicarboxylic acid, itaconic acid, etc.; tricarboxylic acids such as aconitic acid, citric acid, isocitric acid; and aromatic monocarboxylic acids such as benzoic acid, 9-anthracenecarboxylic acid, atrolactinic acid, anisic acid, isopropylbenzoic acid, salicyclic acid and toluic acid, etc., among others.

② Phosphoric Acids

The phosphoric acids mentioned above are not particularly restricted, but there can be mentioned phosphoric acid and its partial esters, such as inorganic phosphoric acid, phosphoric monomethyl ester, phosphoric dimethyl ester, phosphoric monoethyl ester, phosphoric diethyl ester, phosphoric monobutyl ester, phosphoric dibutyl ester, phosphoric mono-2-ethylhexyl ester, phosphoric di-2-ethylhexyl ester, phosphoric monoisopropyl ester, phosphoric diisopropyl ester, phosphoric monooctyl ester, phosphoric dioctyl ester, phosphoric monooleyl ester, phosphoric dioleyl ester, etc.; phosphorous acid and its partial esters; alkyl(or aryl) phosphonic acids and partial esters of alkyl(or aryl) phosphonic acids; dialkyl(or aryl)phosphinic acids and partial esters of dialkyl(or aryl)phosphinic acids, among others.

③ Other Acids

As the acids other than the above-mentioned acids, which can be used, there can be mentioned sulfonic acids such as p-toluenesulfonic acid, methanesulfonic acid, benzenesulfonic acid, naphthalene-α-sulfonic acid, etc.; and inorganic acids such as hydrochloric acid and sulfuric acid, among others.

As said acid (B), the acids mentioned above can be used each alone or in a combination of two or more species. In the present invention, carboxylic acids can be used with advantage from the standpoint of ease of use.

The amine (C) to be formulated in the curable composition of the present invention is not particularly restricted insofar as it is a compound having at least one amino group within its molecule, but there can be mentioned a variety of amines such as primary amines, secondary amines and tertiary amines and amine derivatives.

The primary amines mentioned above are not particularly restricted, but there can be mentioned aliphatic primary amines such as methylamine, ethylamine, propylamine, isopropylamine, isopropyl alcohol amine, butylamine, 1-ethylbutylamine, isobutylamine, pentylamine, octylamine, laurylamine, monoethanolamine, diethylaminopropylamine, oleylamine, cyclohexylamine, benzylamine, guanidine, 2-ethylhexylamine, triethylenetetramine, etc. and aromatic primary amines such as aniline, nitroaniline, phenylenediamine, toluidine, toluylamine, xylenediamine, 2,3-xylidine, anisidine, phenetidine, benzidine, benzylamine, naphthylamine and so forth.

The secondary amines mentioned above are not particularly restricted, but there can be mentioned aliphatic secondary amines such as dimethylamine, diethylamine, diethanolamine, diethylenetriamine, dibutylamine, N-methylbutylamine, piperidine, diisopentylamine, pyrrolidine, morpholine, 2-ethyl-4-methylimidazole, etc. and aromatic secondary amines such as N-ethylnaphthylamine, acetanilide, benzylaniline, diphenylguanidine and so forth.

The tertiary amines mentioned above are not particularly restricted, but there can be mentioned aliphatic tertiary amines such as trimethylamine, triethylamine, triethanolamine, tripropylamine, tributylamine, N,N-dimethylbutylamine, N,N-dimethyloctylamine, N,N-dimethyllaurylamine, 1,4-diazabicyclo[2.2.2]octane (DABCO), 1,8-diazabicyclo[5.4.0]undecene (DBU)-7, etc. and aromatic tertiary amines such as N,N-dimethylaniline, N,N-dibenzylaniline, dimethylaminobenzoic acid, 2,4,6-tris (dimethylaminomethyl)phenol and so forth.

As said component (C), these amines can be used each alone or in a combination of two or more species. Among these amines, primary amines are preferred from the standpoint of activity.

The tin catalyst (D) to be formulated in the curable composition of the present invention is not particularly restricted, but there can be mentioned salts of tin with carboxylic acids, such as dibutyl dilaurate, dibutyl tinmaleate, dibutyltin diacetate, stannous octoate, stannous naphthenate, etc., reaction products of dibutyltin oxide with phthalic esters, and tin alkoxides such as dibutyltin diacetylacetonate, dibutyltin bis (ethyl acetoacetate) and dibutyltin dimethoxide and so forth.

It is preferred that the above-mentioned component (B) and component (C) to be formulated in the present invention are added each in molar excess over said component (D).

If the formulating amount of said component (B) or said component (C) is not more than equimolar to the component (D), the strain-reducing effect will be drastically compromised, therefor the case is not preferable.

The amount of said component (D) relative to 100 weight parts of oxyalkylene polymer (A-1) is preferably 0.1 to 20 weight parts, more preferably 0.1 to 10 weight parts. If the amount is less than 0.1 weight part, the curing reaction of the formulation will not proceed sufficiently. If the amount of component (D) exceeds 20 weight parts, localized heating and foaming will take place in curing so that no satisfactory cured product will be obtained, therefor the case is not preferable.

The curable composition of the present invention may be supplemented with any of various plasticizers where necessary.

Said plasticizers are not particularly restricted, but there can be mentioned phthalic ester plasticizers such as dimethyl phthalate, diethyl phthalate, dibutyl phthalate, diheptyl phthalate, dioctyl phthalate, diisononyl phthalate, diisodecyl phthalate, diisoundecyl phthalate, butyl benzyl phthalate, dilauryl phthalate, dicyclohexyl phthalate, etc.; epoxy plasticizers such as epoxidized soybean oil, epoxidized linseed oil, benzyl epoxystearate, etc.; polyester plasticizers such as polyesters of dibasic acids with a dihydric alcohol; polyethers such as polypropylene glycol and its derivatives, among others. Those plasticizers can be used each alone or in a combination of two or more species.

The curable composition of the present invention may optionally contain a silyl hydrolyzing-condensation catalyst other than said tin catalyst for promoting the reaction of said reactive silicon group. Such silanol catalysts other than tin catalysts are not particularly restricted, but there can be mentioned titanic esters such as tetrabutyl titanate, tetrapropyl titanate, etc.; organoaluminum compounds such as aluminum trisacetylacetonate, aluminum tris(ethyl acetoacetate), diisopropoxyaluminum ethylacetoacetate, etc.; reaction products of a bismuth salt with organic carboxylic acids, such as bismuth tris(2-ethylhexanoate), bismuth tris(neodecanoate), etc.; chelate compounds such as zirconium tetraacetylacetonate, titanium tetraacetylacetonate, etc.; organolead compounds such as lead octoate etc.; and organovanadium compounds, among others. Those catalysts can be used each alone or in a combination of two or more species.

Where necessary, the curable composition of the present invention may be further supplemented with various additives such as a dehydrating agent, a compatibilizing agent, an adhesion improving agent, a modifier, a storage-stability improving agent, a filler, an antioxidant, an ultraviolet absorber, a sequestrant, an antiozonant, a light stabilizer, an amine series radical chain terminator, a phosphorus series peroxide decomposer, a lubricant, a pigment, a blowing agent, a flame retardant, an antistatic agent and so forth.

Said filler is not particularly restricted but there can be mentioned wood, meal, walnut shell flour, rice hull flour, pulp, cotton chip, mica, graphite, diatomaceous earth, China clay, kaolin, clay, talc, pyrogenic or fumed silica, precipitated silica, silicic anhydride, quartz powder, glass beads, calcium carbonate, magnesium carbonate, titanium oxide, glass balloon, aluminum powder, zinc dust, asbestos, glass fiber, carbon fiber, carbon black and so forth. These fillers can be used each alone or in a combination of two or more species.

The curable composition of the present invention may contain, in addition to said oxyalkylene polymer (A-1) containing at least one reactive silicon group per molecule, another polymer having a reactive silicon group. Among such polymers, polydimethylsiloxane can be mentioned as an example.

The method of producing the curable composition of the present invention is not particularly restricted. Thus, for example, said component (B), component (C) and component (D) may be independently added to said component (A-1) or to said (A-1) component having (A-2) blended. Alternatively, said components (B) and (C) may be added in the first place and said component (D) be then added. Preferred is the latter method. Furthermore, where necessary, the method of preparing a uniform dispersion by judicious control of heat and agitation conditions or the method comprising dissolving and mixing each component by means of a mixer, a roll, or a kneader can be employed. A dispersibility improving agent may also be used concomitantly.

The curable composition that can be obtained in the above manner can be provided not only in a two-component type but also in a one-component type. Such a one-component type can be provided by preparing the curable composition of the invention in a substantially anhydrous state, and this system can enjoy a long shelf-life if stored in a hermetically sealed condition and yet, upon exposure to the atmospheric air, begins to cure promptly from the surface.

The curable composition of the present invention finds application as an elastomeric sealant in the building, civil engineering and industrial fields, and can be used as a paint, an adhesive, an impregnant or a coating material as well.

BEST MODE FOR CARRYING OUT THE INVENTION

The following examples illustrate the present invention in further detail but are by no means limitative of the. scope of the invention.

EXAMPLE 1

An internal mixer (planetary mixer) was charged with 65 wt. parts of Kaneka MS Polymer S203 available from Kaneka Corporation, as said hydrolyzable silyl group-terminated oxyalkylene polymer, and 35 wt. parts of Kaneka MS polymer S303 available from Kaneka Corporation, as said hydrolyzable silyl group-terminated oxyalkylene polymer, 70 weight parts of DIDP (diisodecyl phthalate) as plasticizer, 200 weight parts of surface-modified ground calcium carbonate as filler, 10 weight parts of titanium oxide, 10 weight parts of aliphatic amide wax as antisagging agent, 1 weight part of ultraviolet absorber and 1 weight part of light stabilizer, and the charge was dehydrated with constant mixing in vacuo at 120° C. for 2 hours. After cooling to room temperature, 3 weight parts of vinyltrimethoxysilane as viscosity stabilizer, 2 weight parts of N-(β-aminoethyl)-γ-aminopropyltrimethoxysilane as a tackifier, a mixture of 2.33 weight parts of 2-ethylhexanoic acid and 3.0 weight parts of laurylamine as curing catalyst, and 1 weight part of dibutyltin diacetylacetonate (U-220) were further added and the mixture was stirred at room temperature and dispensed into an air-tight vessel to provide a one-component curable composition.

The tensile properties, recovery and adhesiveness of the composition thus obtained were evaluated by the following methods. The results are shown in Table 1.

Tensile Properties

The composition was spread in a thickness of about 3 mm and allowed to sit at 23° C., 55% RH for 3 days and then at 50° C. for 4 days to provide a cured product. This specimen was evaluated for tensile properties in accordance with JIS K6301.

Recovery

The cured product obtained in the same manner as above was allowed to sit at 70° C. for 2 days, in water at 23° C. for 1 day, at 70° C. for 3 days, in water at 23° C. for 1 day, and at 23° C., 55% RH for 1 day in the order mentioned. From this sheet, a specimen in the shape of a No. 3 dumbbell as directed in JIS K6301 was punched out and kept stretched from 20 mm to 40 mm between markings for 24 hours. At one hour after release of the tension, the percentage recovery of the length between the markings was calculated.

Adhesiveness

Using aluminum, glass and mortar as substrates, the sealant was spread on each substrate surface and allowed to sit for curing at 23° C., 55% RH for 7 days to give cured products. The cured samples were respectively subjected to a manual peeling test and the degree of peel was visually evaluated according to the following criteria.

○: Little interfacial peel between sealant and substrate

Δ: Some interfacial peel between sealant and substrate

X: Substantial interfacial peel between sealant and substrate

EXAMPLES 2 to 4 and

Comparative Examples 1 to 6

Using 2-ethylhexanoic acid, laurylamine and dibutyltin diacetylacetonate in the amounts indicated in Table 1, the procedure of Example 1 was otherwise repeated. The results are shown in Table 1.

The numbers of moles of 2-ethylhexanoic acid, laurylamine and dibutyltin diacetylacetonate used in Comparative Examples 5 and 6 were equal. The results are shown in Table 1.

Table 1 an amine (C), and a tin-series curing catalyst (D), said acid (B and said amine (C) being contained respectively in molar excess over the tin-series curing catalyst (D).

2. The curable composition according to claim 1 wherein the reactive silicon group is represented by the general formula (2):

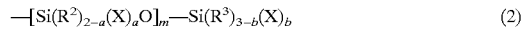

$$—[Si(R^2)_{2-a}(X)_aO]_m—Si(R^3)_{3-b}(X)_b \quad (2)$$

wherein $R^2$ and $R^3$ are the same or different and each represents an alkyl group of 1 to 20 carbon atoms, an aryl group of 6 to 20 carbon atoms, an alkyl group of 7 to 20 carbon atoms or a triorganosiloxy group of the formula $(R^4)_3SiO—$, in which $R^4$ represents a monovalent hydrocarbon group of 1 to 20 carbon atoms and the three $R^4$ groups may be the same or different; when $R^2$ or $R^3$ exists in 2 or more, each may represent the same group or different groups; X represents a hydrolyzable group or a hydroxyl group and when X exists in 2 or more, each may represent the same group or different groups; a represents an integer of 0 to 2; b represents an integer of 0 to 3; m represents an integer of 0 to 19 and when m exists in 2 or more, a in m of the $—[Si(R^2)_{2-a}(X)_aO]_m—$ group may represents the same value or different values; X exists in at least one.

3. The curable composition according to claim 1 wherein the acid (B) is a carboxylic acid.

4. The curable composition according to claim 1 wherein the amine (C) is a primary amine.

5. The curable composition according to claim 1 comprising a vinyl polymer having a reactive silicon group (A-2)

|  | Example | | | | Comparative Example | | | | | |
| --- | --- | --- | --- | --- | --- | --- | --- | --- | --- | --- |
| Catalysts [weight parts] | 1 | 2 | 3 | 4 | 1 | 2 | 3 | 4 | 5 | 6 |
| 2-Ethylhexanoic acid | 2.33 | 0.34 | 1.17 | 1.17 | — | — | 2.00 | — | 0.17 | 0.34 |
| Laurylamine | 3.00 | 0.43 | 1.50 | 1.50 | — | — | — | 3.00 | 0.22 | 0.43 |
| Kaneka MS Polymer S203 | 65 | 65 | 65 | 65 | 65 | 65 | 65 | 65 | 65 | 65 |
| Kaneka MS Polymer S303 | 35 | 35 | 35 | 35 | 35 | 35 | 35 | 35 | 35 | 35 |
| Plasticizer | 70 | 70 | 70 | 70 | 70 | 70 | 70 | 70 | 70 | 70 |
| Calcium carbonate | 200 | 200 | 200 | 200 | 200 | 200 | 200 | 200 | 200 | 200 |
| Titanium oxide | 10 | 10 | 10 | 10 | 10 | 10 | 10 | 10 | 10 | 10 |
| Antisagging agent | 10 | 10 | 10 | 10 | 10 | 10 | 10 | 10 | 10 | 10 |
| Ultraviolet absorber | 1 | 1 | 1 | 1 | 1 | 1 | 1 | 1 | 1 | 1 |
| Light stabilizer | 1 | 1 | 1 | 1 | 1 | 1 | 1 | 1 | 1 | 1 |
| Vinylsilane | 3 | 3 | 3 | 3 | 3 | 3 | 3 | 3 | 3 | 3 |
| Aminosilane | 2 | 2 | 2 | 2 | 2 | 2 | 2 | 2 | 2 | 2 |
| Dibutyltin diacetylacetonate | 1.0 | 0.5 | 0.5 | 1.0 | 1.0 | 0.5 | 1.0 | 1.0 | 0.5 | 1.0 |
| Evaluation Results | | | | | | | | | | |
| Stress at 100% elongation (MPa) | 0.35 | 0.45 | 0.43 | 0.41 | 0.44 | 0.48 | 0.51 | 0.36 | 0.48 | 0.45 |
| Bleaking strength (MPa) | 1.21 | 1.26 | 1.09 | 1.15 | 1.17 | 1.39 | 1.27 | 1.12 | 1.25 | 1.24 |
| Elongation at break (%) | 830 | 660 | 640 | 690 | 640 | 700 | 650 | 750 | 660 | 660 |
| Recovery (%) | 72 | 74 | 75 | 73 | 68 | 74 | 63 | 70 | 74 | 72 |
| Adhesiveness | ○ | ○ | ○ | ○ | ○ | ○ | ○ | Δ | ○ | ○ |

Industrial Applicability

The present invention, constituted as described above, can provide a curable composition insuring a reduced stress without sacrificing restoring force and other physical properties and having a sufficient degree of adhesiveness.

What is claimed is:

1. A one-component curable composition with a long shelf-life which is stored in a hermetically sealed condition, comprising an oxyalkylene polymer having at least one reactive silicon group per molecule (A-1), an acid (B), as blended with said oxyalkylene polymer having at least one reactive silicon group per molecule (A-1).

6. The curable composition according to claim 5, wherein the reactive silicon group is represented by the general formula (2):

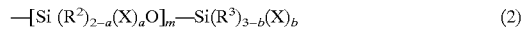

$$—[Si(R^2)_{2-a}(X)_aO]_m—Si(R^3)_{3-b}(X)_b \quad (2)$$

wherein $R^2$ and $R^3$ are the same or different and each represents an alkyl group of 1 to 20 carbon atoms, an aryl group of 6 to 20 carbon atoms, an alkyl group of 7 to 20 carbon atoms or a triorganosiloxy group of the formula $(R^4)_3SiO-$, in which $R^4$ represents a monovalent hydrocarbon group of 1 to 20 carbon atoms, and the three $R^4$ groups may be the same or different; when $R^2$ or $R^3$ exists in 2 or more, each may represent the same group or different groups; X represents a hydrolyzable group or a hydroxyl group and when X exists in 2 or more, each may represent the same group or different groups, a represents an integer of 0 to 2; b represents an integer of 0 to 3; m represents an integer of 0 to 19 and when m exists in 2 or more, a in m of the $-[Si(R^2)_{2-a}(X)_aO]_m-$ group may represent the same value or different values; X exists in at least one.

7. The curable composition according to claim 5, wherein the acid (B) is a carboxylic acid.

8. The curable composition according to claim 5, wherein the amine (C) is as primary amine.

9. The curable composition according to claim 2, wherein the acid (B) is a carboxylic acid.

10. The curable composition according to claim 2, wherein the amine (C) is as primary amine.

11. The curable composition according to claim 3, wherein the amine (C) is as primary amine.

* * * * *

UNITED STATES PATENT AND TRADEMARK OFFICE
CERTIFICATE OF CORRECTION

PATENT NO. : 6,486,289 B1
DATED : November 26, 2002
INVENTOR(S) : Yamaguchi et al.

It is certified that error appears in the above-identified patent and that said Letters Patent is hereby corrected as shown below:

Column 10,
Lines 6, 26 and 28, change "The curable composition according to claim 1 wherein" to, -- The one-component curable composition according to claim 1 wherein --
Line 30, change "The curable composition according to claim 1 com-" to, -- The one-component curable composition according to claim 1 com- --
Line 58, change "The curable composition according to claim 5, wherein" to, -- The one-component curable composition according to claim 5, wherein --

Column 12,
Lines 1 and 3, change "The curable composition according to claim 5, wherein" to,
-- The one-component curable composition according to claim 5, wherein --
Line 5, change "The curable composition according to claim 2, wherein" to,
-- The one-component curable composition according to claim 2, wherein --
Line 7, change "The curable composition according to claim 2," to, -- The one-component curable composition according to claim 2, --
Line 9, change "The curable composition according to claim 3," to,
-- The one-component curable composition according to claim 3, --

Signed and Sealed this

Nineteenth Day of August, 2003

JAMES E. ROGAN
*Director of the United States Patent and Trademark Office*